United States Patent [19]
Heckel et al.

[11] Patent Number: 5,577,347
[45] Date of Patent: Nov. 26, 1996

[54] SAFETY DEVICE FOR ELECTRIC WINDOW OPENERS

[75] Inventors: Robert J. Heckel, Cormeilles; Enrico Fin, Paris; Achim R. Gier, Garches; Pascal Bonduel, Sully S/Loire, all of France

[73] Assignee: Rockwell Body and Chassis System, France en abrege, France

[21] Appl. No.: 87,836

[22] Filed: Jul. 2, 1993

[30] Foreign Application Priority Data

Jul. 10, 1992 [FR] France .................. 92 08619

[51] Int. Cl.[6] .................................................. E05F 15/02
[52] U.S. Cl. ............................................ 49/28; 49/349
[58] Field of Search ........................ 49/26, 28, 31, 49/348, 349, 350, 351, 352

[56] References Cited

U.S. PATENT DOCUMENTS

| | | | |
|---|---|---|---|
| 2,047,712 | 6/1936 | Monroe | 49/26 X |
| 2,649,300 | 8/1953 | Launder | 49/26 X |
| 2,817,512 | 12/1957 | Christen | 49/26 |
| 2,883,183 | 4/1959 | Fansterwalder et al. | 49/26 |
| 3,742,646 | 7/1973 | Piech | 49/28 |

FOREIGN PATENT DOCUMENTS

| | | |
|---|---|---|
| 1941256 | 2/1971 | Germany. |
| 3215203 | 10/1983 | Germany. |
| 2107387 | 4/1983 | United Kingdom. |

*Primary Examiner*—Jerry Redman

[57] ABSTRACT

This device comprises mechanical link including a pawl (25) establishing a rigid drive link between a driving input member (2) and an output member (22), interacting with a prestressed element (31) which tends to hold the pawl in connection with the driving input member or with the driven output member, for so long as the force transmitted by the pawl remains below a predetermined value; this system automatically interrupts the kinematic drive chain of the movable member in the case of a force exceeding a predetermined value. This arrangement makes the device practically insensitive to friction and eliminates the uncertainty on the threshold of the triggering force.

12 Claims, 4 Drawing Sheets

SAFETY DEVICE FOR ELECTRIC WINDOW OPENERS

BACKGROUND OF THE INVENTION

1. Field of the Invention

The subject of the present invention is a safety device for electric openers of a vehicle, for example window lifters and sunroofs, this opener comprising a toothed wheel driven by a worm of a motorized reduction gear and a kinematic chain for linking between the wheel and the movable member to be driven (window or sunroof).

2. Description of the Related Art

As is known, three types of window lifter are currently used on motor vehicles:

a) arm and toothed sector window lifter: the output pinion of the drive motorized reduction gear rotates a toothed sector about a spindle which is fixed with respect to the door, and an arm secured to the sector transmits the movement to the window.

b) rack cable window lifter: the output pinion of the drive motorized reduction gear directly drives the rack cable which slides in a sheath (metal or plastic). At the other end of the cable is fixed a carriage, sliding in the sheath, onto which the window is fixed.

c) twisted cable (Bowden cable) window lifter: the output of the motorized reduction gear drives a drum on which there is wound a Bowden cable, which transmits the movement to a carriage sliding on a guide rail, this carriage being fixed to the window.

When an obstacle is located on the closure path of the window, the system must recognize the presence of an abnormal phenomenon and, if the force on the window exceeds a limiting value, the window must not continue its journey but must stop and at least release the force. This release of the force may be obtained either by releasing the window which descends under a small force or under the effect of its own weight if the friction in the lateral seal allows it, or by reversing the movement of the window which is then forced to descend.

In order to solve this problem electronic or electromechanical devices have already been produced which include sensors of various types capable of detecting the decelerations of the motor compared to the variations in voltage, or variations in current drawn, as well as the number of revolutions performed which they memorize, and which constitutes an image of the position of the window.

However, these electronic and electromechanical devices exhibit, amongst other drawbacks, the drawback of being relatively costly, due to their complexity, which is obviously an obstacle to their distribution on a wide scale. In addition, these mechanisms develop friction or use elastic drive components which do not make it possible to obtain reliable triggering as concerns the value of the force, and as concerns the sudden nature of the triggering.

SUMMARY OF THE INVENTION

The object of the invention is therefore to provide a safety device for electric openers in which these abovementioned drawbacks are eliminated.

The safety device which forms the subject of the invention for electric openers of a vehicle, particularly window lifters and sunroofs, comprises a drive element such as a motorized reduction gear and a kinematic chain for linking to the movable member to be driven, exclusively mechanical means for automatically interrupting the kinematic drive chain of the movable member in the case of a force exceeding a predetermined value opposing the travel of the said movable member in order totally to cancel out the drive forces.

In accordance with the invention, the said exclusively mechanical means comprise a first pawl arranged so as to establish a rigid drive link between a driving input member and an output member of the kinematic chain, interacting with a prestressed element or a second pawl urged with a force which tends to hold the said first pawl in connection with the driving input member or with the driven output member, for so long as the force transmitted by the first pawl remains lower than the said predetermined value.

By virtue of this structure, the drive component is not elastic, contrary to some known devices, so that the uncertainty on the threshold of the triggering force is eliminated, which constitutes an essential advantage of the invention.

In addition, the rigidity of the drive component ensures the sudden nature of the triggering and eliminates oscillations which are ergonomically disagreeable to use, and are observed in some prior systems.

Finally, this arrangement is practically insensitive to friction.

In a first type of embodiment in accordance with the invention, intended to equip window lifters of the arm and toothed sector type, of the cable rack type, and of the Bowden cable type, the said exclusively mechanical means are arranged inside the motorized reduction gear and include, for example:

a tooth inside the toothed wheel made in a recess of the latter, a pawl articulated on a rotary plate coaxial with the said toothed wheel about a spindle parallel to that of the latter, and one end of which interacts with the said tooth inside the toothed wheel in order to drive the plate in rotation when the toothed wheel rotates, a prestressed elastic member bearing on the plate and interacting with the pawl on the other hand, in order to keep the end of the latter bearing against the tooth inside the wheel for as long as the force transmitted by the latter remains below the predetermined value, this elastic member being capable of tilting into a second stable position in which it uncouples the pawl from the associated tooth when the force transmitted by the latter to the pawl exceeds the said predetermined value.

Such purely mechanical devices are of simple structures and are therefore inexpensive.

Other features and advantages of the invention will emerge during the description which will follow, given with reference to the appended drawings which illustrate several embodiments thereof by way of non-limiting examples.

DESCRIPTION OF THE PREFERRED EMBODIMENTS

Figure 1:
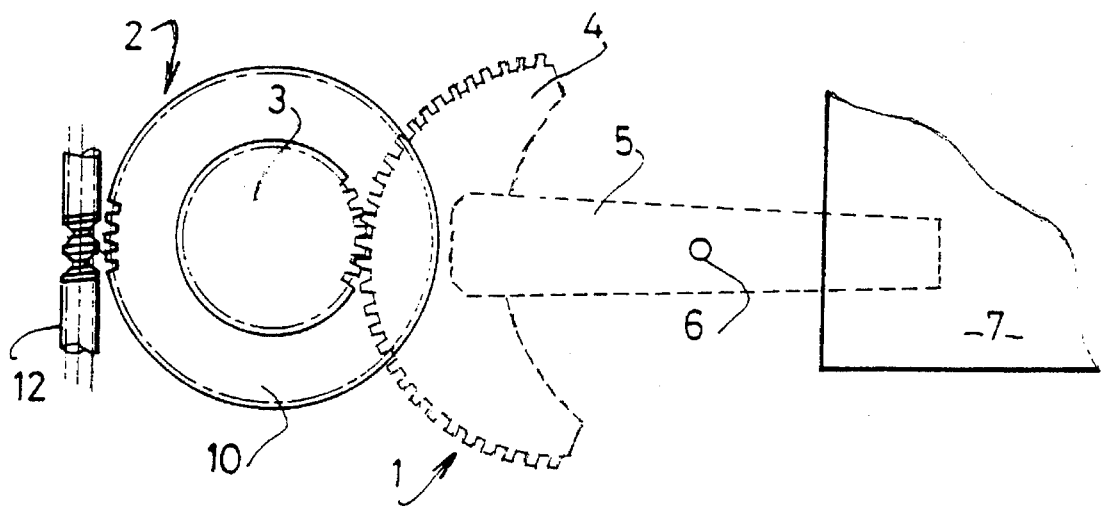
FIG. 1 is a simplified elevation view of an opener made up of an electric window lifter for a vehicle, known, of the arm and toothed sector type.
Figure 2:
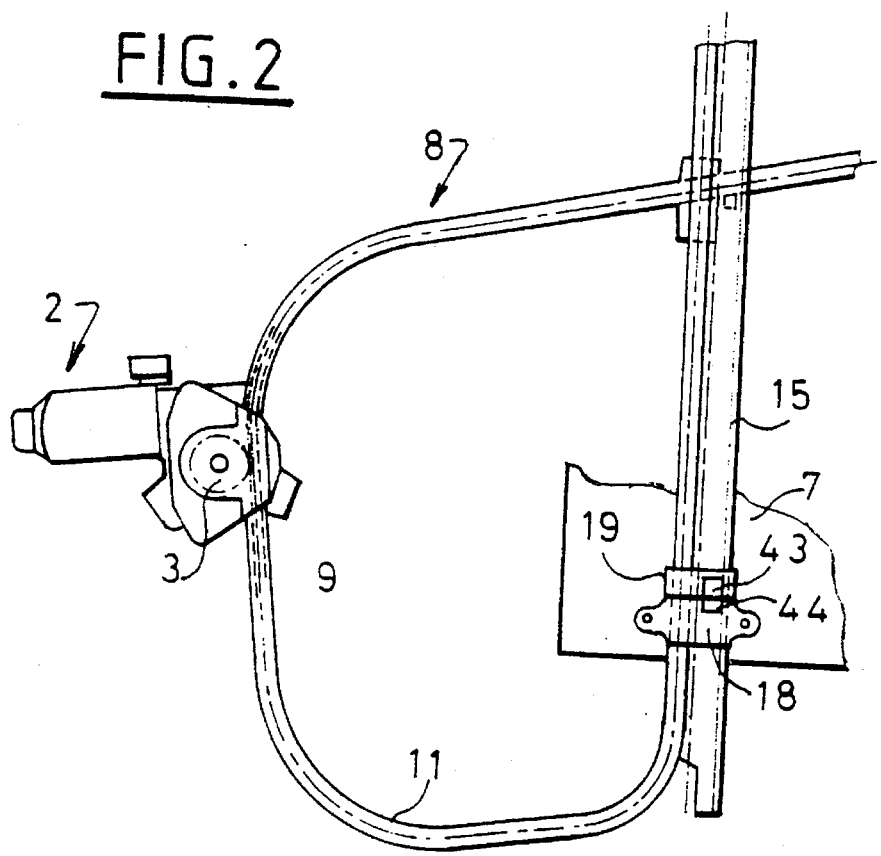
FIG. 2 is a simplified partial elevation view of an electric opener according to one embodiment of the invention, of the rack cable type.
Figure 3:
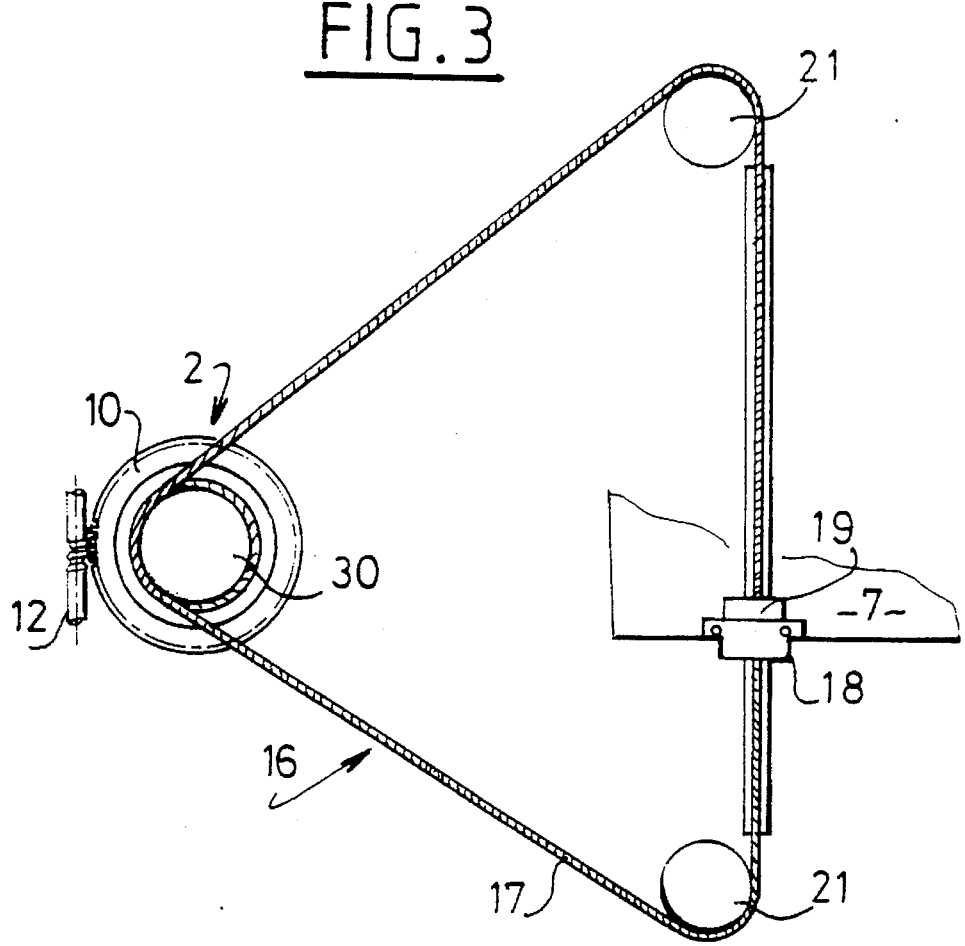
FIG. 3 is a simplified partial elevation view of an electric window lifter according to the invention, of the Bowden cable type.

The window lifters represented in FIG. 1 to 3 are known per se, but have been represented in order to facilitate the understanding of the various embodiments of the invention represented in FIG. 4 to 10.

The window lifter 1 of FIG. 1 comprises a motorized reduction gear 2 with a worm 12 engaged with a toothed wheel 10 secured to an output pinion 3 which meshes with a toothed sector 4. The latter is secured to an arm 5 articulated about a spindle 6 and whose end opposite sector 4 carries the window 7.

The window lifter 8 illustrated in FIG. 2 is of the type with a rack cable 9 sliding in a sheath 11. The cable 9 meshes with the output pinion 3 of the motorized redution gear 2. To the rack cable 9 is fixed a carriage 18 itself connected to a carriage 19 supporting a window 7, the two carriages 18, 19 being capable of sliding along a guide rail 15.

The window lifter 16 represented in FIG. 3 is of the Bowden cable type 17 wound around return pulleys 21 and a drum 30 secured to the toothed wheel 10 of the motorized reduction gear 2. To the cable 17 is fixed a carriage 19 mechanically connected to a carriage 18 supporting the window 7.

The invention provides exclusively mechanical means for automatically interrupting the kinematic drive chain of the window 7, in the event of the latter, in its raising travel, encountering an obstacle whose resistance to the advancement of the window gives rise to a drive force on the latter exceeding a predetermined value.

Figure 4:
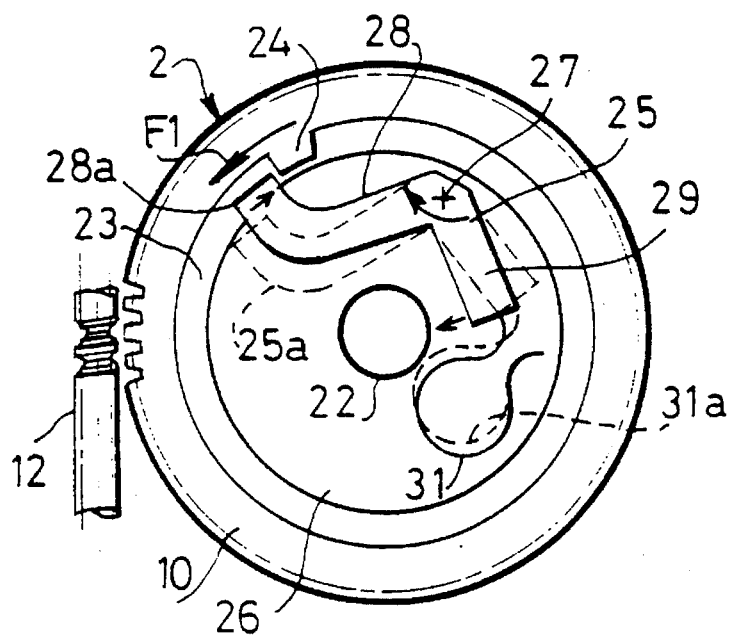
FIG. 4 is an elevation view of a first embodiment of the safety device according to the invention applicable to the three types of window lifters represented in FIG. 1 to 3.

In the embodiment represented in FIG. 4, the safety device is applicable equally well to any one of the three window lifters described hereinabove because the automatic interruption of the kinematic chain in the event of an excessive force intervenes inside the motorized reduction gear 2. For this purpose the toothed wheel 10, driven by the worm 12 and mounted so as to rotate about a spindle 22 has a recess 23 on the edge of which is made a tooth 24 projecting in the radial direction. A pawl 25, is articulated on a plate 26, can rotate coaxially with the toothed wheel 10 about a spindle 27 parallel to the spindle 22. The pawl 25 includes two V-shaped branches 28, 29 extending on either side of the spindle 27, the branch 28 including an end part 28a which bears on the tooth 24 in its normal engaged position, represented in solid line in FIG. 4. In this position the pawl 25 provides the rotational coupling between the toothed wheel 10 and the plate 26 as well as the spindle 22. The pawl 25 is held in this coupling position by an elastic prestressed member 31, formed by a spring, one end of which is connected to the branch 29 of the pawl 25 and the opposite end 31a of which is fixed to the plate 26.

The spring 31 in normal operation holds the end 28a of the pawl 25 bearing on the tooth 24 and therefore allows the transmission of force onto the plate 26 in the direction of rotation indicated by the arrow F1 which corresponds to raising the window. The pawl 25 is kept in its position for so long as the force of the spring 31 generates a torque around the spindle 22 which is greater than that generated in the opposite direction (F1) by the tooth 24.

Consequently, for as long as the force that the device must supply to the window does not exceed a certain predetermined limit, the pawl 25 remains in place and the window 7 rises. If an obstacle opposes the normal raising of the window, the force on the latter increases abruptly, as does the torque F1 supplied by the wheel 10 and the tooth 24. The opposite torque developed by the spring 31 on the arm 28 can no longer hold the pawl 25 which receives a greater torque from the tooth 24 because the force to be transmitted has increased. Thus, from the moment at which the force transmitted by the tooth 24 exceeds a predetermined value, corresponding to the characteristics of the spring 31, the pawl 25 tilts into its second stable position, represented in chain line (25a). For this reason the transmission between the tooth 24 and the pawl 25 stops, because the contact between the tooth 24 and the end part 28a is eliminated, and the output of the motorized reduction gear connected to the plate 26 is therefore uncoupled from the motor.

Figures 5, 6:
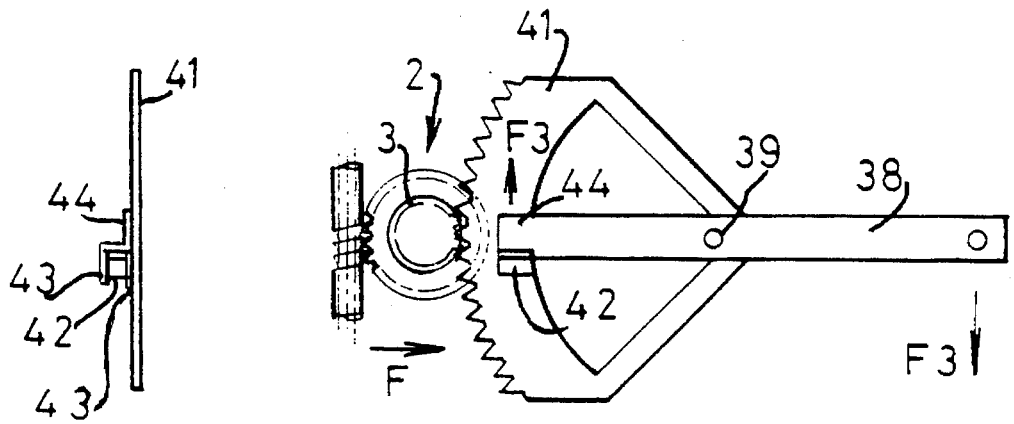
FIG. 5 is a partial longitudinal elevation view of an arm and sector window lifter equipped with a safety device according to a second embodiment of the invention.
FIG. 6 is a partial end-on view in the direction F of FIG. 5.

In the device of FIG. 5 and 6, applied solely to window lifters of the arm and toothed sector type, the kinematic chain is interrupted between the arm and the toothed sector of the window lifter.

The arm 38 causes the Window (not represented) to rise or descend by tilting about a spindle 39. The arm 38 is driven by the sector 41 with which it tilts about the spindle 39 in order to make the window rise or descend. A safety feature may therefore be provided which allows an automatic uncoupling of the arm 38 and of the sector 41 starting from a force of predetermined value.

The safety device comprises a magnet 42 surrounded by two armature plates 43 and fixed to the toothed sector 41, as well as a ferromagnetic piece fixed to the arm 38, for example an L-shaped piece 44. The piece 44, produced particularly from steel sheet, may be a single-piece folding with the arm 38 or attached to it. It is placed in contact with the armatures 43 which concentrate the flux of the magnet 42 on their contact surfaces. The piece 44 is therefore attracted by the armatures 43 with a certain force, and thus retains the arm 38 secured to the sector 41 for as long as the force F3 exerted on the arm 38 remains insufficient to overcome the force of attraction of the magnet 42 (taking into account the length of the lever arms on either side of the spindle 39). If on the other hand the force F3 on the window exceeds a predetermined value, the arm 38 will detach from the armatures 43 of the magnet 42, and therefore uncouple the window from the drive movement provided by the sector 41.

Figure 7:
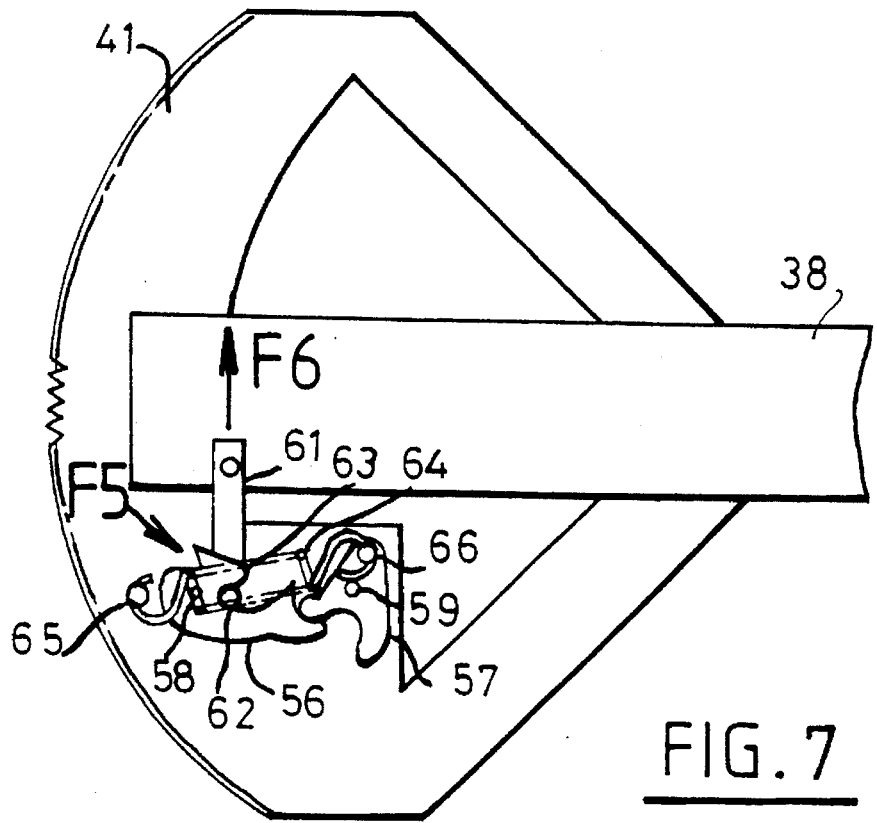
FIG. 7 is a partial longitudinal elevation view of a third embodiment of the safety device according to the invention, equipping an arm and toothed sector window lifter.
Figure 10:
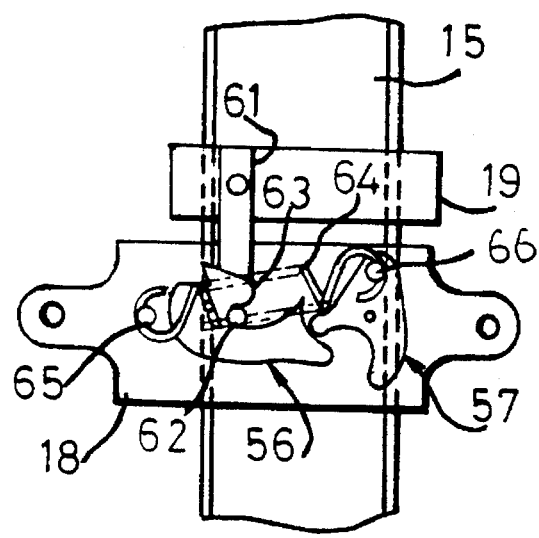
FIG. 10 is an elevation view of a fifth embodiment of the safety device according to the invention which can be used on rack cable or smooth cable window lifters.

The safety device illustrated in FIGS. 7 and 10 comprises two pawls 56 and 57 articulated on respective spindles 58, 59 fixed to the sector 41. A finger 61 secured to the arm 38 is provided with an end stud 62 engaged in a recess of the pawl 56 delimited by a nose 63 of the said pawl 56. A spring 64, for example a helical spring, has one of its ends fixed to the sector 41 by fastening to a peg 65, whilst its other end is fastened to a peg 66 carried by the pawl 57. The latter is thus elastically urged by the spring 64 to bear on one end of the pawl 56, on which is exerted a torque F5 tending to keep the stud 62 clipped into the recess of the nose 63 of the pawl 56.

This clipping-in is maintained for as long as the force transmitted to the stud 62 by the pawl 56 remains below a predetermined value. If an obstacle opposes the closure of the window, the force which the pawl 56 must transmit to the finger 61 by means of the end stud 62, and which is opposite the torque F5, ends up becoming sufficient (arrow F6) to tilt the pawl 56 (in the anti-clockwise direction in FIG. 7), thereby stretching out the spring 64. The pawl 56 is thus released rotationally by disengagement of the stud 62 with respect to the nose 63, which gives rise to the uncoupling of the sector 41 with respect to the arm 38.

Figure 8:
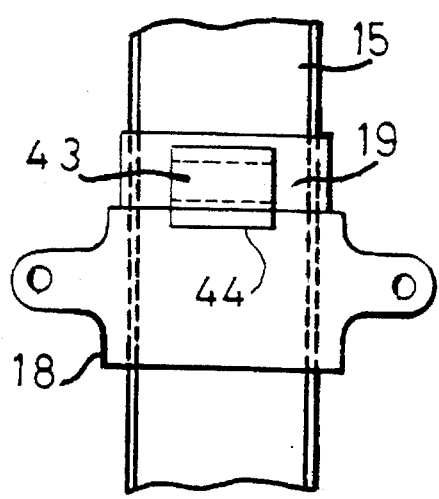
FIG. 8 is a partial elevation view of a fourth embodiment of the safety device according to the invention, equipping a Bowden cable or rack cable window lifter.
Figure 9:
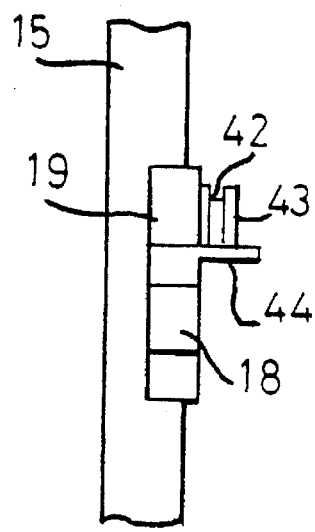
FIG. 9 is a lateral elevation view of the device of FIG. 8.

In the embodiment of FIG. 8 and 9 for a rack cable and Bowden cable window lifter, the interruption of the kinematic drive chains of the window is produced between the two carriages 18 and 19 secured respectively to the window 7 and the cable 9 or 17. It is therefore sufficient to connect the two carriages 18, 19 in normal operation and to uncouple them automatically in the case of an obstacle encountered by the window. In order to do this the same systems are used as those represented in FIG. 5 and 6 for separating the arm 38 and the toothed sector 41. Thus, the safety feature illustrated in FIG. 8 and 9 is the same as that represented in FIG. 5 and 6, so much so that the same numerical references have been used, the only difference being that the sector 41 and the arm 38 are here replaced respectively by the carriages 19 and 18. The operation is moreover the same and therefore does not need to be described again.

In addition to the technical advantages mentioned previously, the various embodiments described hereinabove exhibit the following one: in a way which is inherent to their structure, as soon as the triggering threshold is broached, the breaking of the kinematic line is amplified in order abruptly to cancel out the drive movement. Thus, in the systems with a magnet, as soon as the air gap increases very slightly, the magnetic drive forces decrease so considerably that the drive ceases. This phenomenon of decreasing the drive takes off in an almost exponential manner. Likewise, in the structures with pawls, this same phenomenon evolves according to a sinusoidal law of very small period.

The invention is not limited to the various embodiments described and may include numerous embodiment variants. Thus, for example, it goes without saying that the positioning of the magnet 42 and of the associated piece 44 (FIG. 5 and 6) may be reversed with respect to the one shown, the magnet 42 then being secured to the arm 38 whilst the ferromagnetic piece 44 is secured to the sector 41. Likewise with the other devices described, particularly those of FIG. 8 and 9, it being possible for the position on the respective carriages 18 and 19 of their coupling elements to be reversed with respect to the one shown. More generally, the safety devices represented may be replaced by any equivalent means insofar that it relates to exclusively mechanical means, excluding any electrical circuit. These safety devices are particularly inexpensive, whilst being of very reliable operation. The invention can be applied without difficulty to vehicle sunroofs.

We claim:

1. In a safety device for a vehicular electric opener having a movable member, a motorized reduction gear having an output gear, a kinematic chain for coupling said movable member to said output gear, and exclusively mechanical means for automatically interrupting said kinematic drive chain from said movable member when said movable member encounters an inhibiting force which opposes travel of said movable member, thereby causing said movable member to cease travelling the improvement comprising:

coupling means coupling a driving member of said kinematic chain and a driven member of said kinematic chain, said coupling means providing a rigid drive link between said driving member and said driven member so long as said inhibiting force is not present.

2. A device according to claim 1, wherein a subassembly comprising said driving member and said driven member of said vehicular electric opener is selected from the group consisting of an arm and toothed sector type, a the rack cable type, and a Bowden cable type.

3. The device of claim 2, wherein said electric opener is of an arm and toothed sector type, said opener having a toothed sector interacting with said output gear of said motorized reduction gear, an arm pivoted on said toothed sector, one end of said arm fixed to said movable member and a second end of said arm mechanically linked to said toothed sector, wherein said coupling means comprises:

a) a first pawl articulated about a first spindle fixed to said toothed sector;

b) a second pawl articulated about a second spindle fixed to said toothed sector, said second spindle parallel to said first spindle;

c) a finger member fixed to said arm, said finger engaged in a recess of said first pawl; and d) a spring member having first and second ends, said first end fixed to said toothed sector and said second end fixed to said second pawl;

e) said spring member urging said second pawl against said first pawl such that said finger remains engaged in said recess so long as said inhibiting force is not present.

4. The device of claim 2, wherein said electric opener is of an arm and toothed sector type, said opener having a toothed sector interacting with said output gear of said motorized reduction gear, an arm pivoted on said toothed sector, one end of said arm fixed to said movable member and a second end of said arm mechanically linked to said toothed sector, wherein said coupling means comprises:

a) first and second armature plates fixed to one of said toothed sector or said arm;

b) a magnet positioned between said armature plates; and c) a ferromagnetic member fixed to the other of said toothed sector or said arm such that said ferromagnetic member links said toothed sector and arm by being attracted to said magnet;

d) wherein when said inhibiting force is present, said toothed sector and arm become uncoupled, whereby said rigid drive link is interrupted.

5. A device according to claim 2, wherein said vehicle electric opener is selected from a rack cable type and a Bowden cable type, said opener comprising a driven cable and first and second carriages sliding on a guide rail, said first carriage fixed to said cable, said second carriage fixed to said movable member, and said first and second carriages being mechanically coupled, wherein said coupling means is provided such that said first and second carriages are uncoupled when said inhibiting force is present.

6. A device according to claim 5, wherein said coupling means comprises:

a) a magnet fixed to one of said first or second carriages; and b) a ferromagnetic member attached to the other of said first or second carriages;

c) wherein the force of attraction between said magnet and said ferromagnetic member couples said first and second carriages so long as said inhibiting force is not present.

7. A device according to claim 5, wherein said coupling means comprises:

a) first and second pawls articulated on respective parallel spindles, said spindles fixed to one of said first or second carriages;

b) finger member attached to the other of said first or second carriages, said finger member being engaged in a recess of said first pawl; and c) a spring having first and second ends, said first end fixed to one of said first or second carriages, said second end fixed to said second pawl;

d) said spring urging said second pawl against said first pawl such that said finger remains engaged in said recess so long as said inhibiting force is not present.

8. A device according to claim 1, wherein said coupling means comprises:

a) a first pawl positioned so as to provide said rigid drive link between a driving member of said kinematic chain and a driven member of said kinematic chain;

b) a component member selected from the group consisting of a second pawl and a prestressed element, said component member urging said first pawl into position relative to said driving member so as to maintain said rigid drive link so long as said inhibiting force is not present.

9. A device according to claim 8, wherein said coupling means is located within said motorized reduction gear, said coupling means comprising:

a) an output gear comprising a toothed wheel rotatable about an axis;

b) a projecting tooth inside said toothed wheel located on an edge of a recess in said toothed wheel, said tooth rotatable about said axis;

c) a rotary plate mounted coaxial with said toothed wheel;

d) a V-shaped pawl having a first end portion, an intermediate portion, and a second end portion, said pawl articulated about a spindle through said intermediate portion, said spindle fixed to said rotary plate and having an axis parallel to said axis of said output gear;

e) said first end portion of said pawl contacting said projecting tooth so as to form said rigid drive link;

f) said second end portion of said pawl urged by said component member such that said pawl maintains said rigid drive link so long as said inhibiting force is not present.

10. The device of claim 8, wherein said component member comprises a prestressed element capable of adopting two stable positions, a first stable position when said inhibiting force is not present, and a second stable position when said inhibiting force is present.

11. A device according to claim 1, wherein said coupling means comprises:

a) first and second pawls articulated on respective parallel spindles, said spindles fixed to one of said driven or driving members;

b) finger member attached to the other of said driven or driving members, said finger being engaged in a recess of said first pawl; and c) a spring having first and second ends, said first end fixed to one of said driven or driving members, said second end fixed to said second pawl;

d) said spring urging said second pawl against said first pawl such that said finger remains in said recess so long as said inhibiting force is not present.

12. A device according to claim 1, wherein said coupling means comprises:

a) a magnet fixed to one of said driven or driving members; and b) a ferromagnetic member attached to the other of said driven or driving members;

c) wherein the force of attraction between said magnet and said ferromagnetic member couples said driven and driving members so long as said inhibiting force is not present.

* * * * *